(12) United States Patent
Dansfield et al.

(10) Patent No.: US 11,345,358 B2
(45) Date of Patent: May 31, 2022

(54) ENGINE ELECTRONIC CONTROL UNIT FOR A VEHICLE

(71) Applicant: Honda Motor Co., Ltd., Tokyo (JP)

(72) Inventors: Blake James Dansfield, Dublin, OH (US); Yasumasa Kaitani, Dublin, OH (US); Hideaki Yamashita, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 363 days.

(21) Appl. No.: 16/792,622

(22) Filed: Feb. 17, 2020

(65) Prior Publication Data

US 2021/0253115 A1    Aug. 19, 2021

(51) Int. Cl.
| | |
|---|---|
| *B60W 50/02* | (2012.01) |
| *B60W 10/08* | (2006.01) |
| *B60W 10/26* | (2006.01) |
| *B60W 50/04* | (2006.01) |

(52) U.S. Cl.
CPC ........ *B60W 50/0205* (2013.01); *B60W 10/08* (2013.01); *B60W 10/26* (2013.01); *B60W 2050/021* (2013.01); *B60W 2050/043* (2013.01)

(58) Field of Classification Search
CPC .................................................. B60W 50/0205
See application file for complete search history.

(56) References Cited

U.S. PATENT DOCUMENTS

| | | | |
|---|---|---|---|
| 5,883,444 A | 3/1999 | Hirata et al. | |
| 6,358,180 B1* | 3/2002 | Kuroda | F02N 11/0822 |
| | | | 477/203 |
| 7,860,637 B2 | 12/2010 | Yamaguchi | |
| 8,013,563 B2 | 9/2011 | Nakai et al. | |
| 8,577,575 B2 | 11/2013 | Tomura et al. | |
| 9,778,970 B2 | 10/2017 | Kume et al. | |
| 9,815,383 B2 | 11/2017 | Komiyama | |
| 2011/0208412 A1 | 8/2011 | Takahashi | |
| 2011/0221400 A1* | 9/2011 | Takizawa | B60L 53/14 |
| | | | 320/166 |
| 2013/0289854 A1* | 10/2013 | Takahashi | H02J 7/0069 |
| | | | 701/112 |
| 2017/0145977 A1* | 5/2017 | Toyama | F02D 41/062 |
| 2017/0305404 A1* | 10/2017 | Komatsu | H02J 7/0048 |
| 2019/0044361 A1 | 2/2019 | Namiki et al. | |

FOREIGN PATENT DOCUMENTS

| | | | | |
|---|---|---|---|---|
| CN | 102052161 A | * | 5/2011 | ........... B60R 16/023 |
| CN | 102477907 A | * | 5/2012 | ........... F02N 11/0818 |
| CN | 102052161 B | * | 12/2016 | ........... B60R 16/023 |

(Continued)

*Primary Examiner* — Shelley Chen
(74) *Attorney, Agent, or Firm* — Armstrong Teasdale LLP

(57) ABSTRACT

An engine electronic control unit (ECU) for a vehicle includes a non-volatile memory and a microcontroller. The non-volatile memory is configured to store an indicator of ignition status having an initial off-status. The microcontroller is coupled to the non-volatile memory and is configured to receive a SOC of a battery for the engine ECU. The microcontroller is further configured to determine the SOC is insufficient to power-up the engine ECU following a reset condition. The microcontroller is further configured to disable over-writing the indicator of ignition status in response to determining the SOC is insufficient.

20 Claims, 5 Drawing Sheets

(56) References Cited

FOREIGN PATENT DOCUMENTS

| | | | | |
|---|---|---|---|---|
| CN | 106470868 | A * | 3/2017 | ............. B60L 15/20 |
| CN | 109723593 | A * | 5/2019 | ......... B60R 16/0307 |
| DE | 102011055140 | A1 | 5/2012 | |
| JP | H1199891 | A | 4/1999 | |
| JP | 2003244805 | A * | 8/2003 | |
| JP | 4052079 | B2 | 2/2008 | |
| JP | 4457969 | B2 | 4/2010 | |
| JP | 4640309 | B2 | 3/2011 | |
| JP | 2011140896 | A * | 7/2011 | |
| JP | 6244780 | B2 | 12/2017 | |
| KR | 100783862 | B1 | 12/2007 | |

* cited by examiner

ENGINE ELECTRONIC CONTROL UNIT FOR A VEHICLE

FIELD

The field of the disclosure relates generally to starting an engine for a vehicle and, more specifically, to an engine electronic control unit.

BACKGROUND

Modern vehicles are becoming increasingly reliant on electrical systems and, consequently, electrical power. Likewise, conventional electrical systems for vehicles have become more sophisticated and, in some cases, are linked together with the numerous other electrical systems by their respective electrical control units, or "ECUs." Such electrical systems include an engine ECU that controls starting and stopping of an engine, such as a combustion engine.

When the engine is not running, the engine ECU is powered by the vehicle's onboard electrical power source, e.g., a battery. When the engine ECU commands the starter motor to turn the engine, the battery voltage drops sharply as a result of the large current required to turn the starter motor. The reduced battery voltage can, under certain conditions (e.g., a low state of charge (SOC) of the battery), result in the engine ECU powering down, or resetting, until the battery voltage rises to a level sufficient to power up the engine ECU. Accordingly, a need exists to maintain control of engine starting while the engine ECU is powered down and after the engine ECU powers up following such a reset.

BRIEF DESCRIPTION

One aspect of the present disclosure includes an engine electronic control unit (ECU) for a vehicle, including non-volatile memory and a microcontroller. The non-volatile memory is configured to store an indicator of ignition status having an initial off-status. The microcontroller is coupled to the non-volatile memory and is configured to receive a SOC of a battery for the engine ECU. The microcontroller is further configured to determine the SOC is insufficient to power-up the engine ECU following a reset condition. The microcontroller is further configured to disable over-writing the indicator of ignition s status in response to determining the SOC is insufficient.

Another aspect of the present disclosure includes a method of operating an engine for a vehicle. The method includes receiving, at an engine electronic control unit (ECU), a state of charge (SOC) of a battery for the engine ECU. The method includes determining the SOC is insufficient to power-up the engine ECU following a reset condition. The method includes disabling over-writing an indicator of ignition status in memory in response to the determining.

Yet another aspect of the present disclosure includes an engine control system for a vehicle. The engine control system includes a battery, a starter motor, and an engine ECU. The battery is configured to supply a battery voltage. The starter motor is mechanically coupled to an engine and configured to receive the battery voltage form the battery. The engine ECU is coupled to the starter motor and is configured to receive the battery voltage from the battery and receive a SOC for the battery. The engine ECU stores the indicator of ignition status for the vehicle in memory, and disables over-writing the indicator upon determining the SOC is insufficient to power-up the engine ECU following a reset.

The features, functions, and advantages that have been discussed can be achieved independently in various embodiments or may be combined in yet other embodiments further details of which can be seen with reference to the following description and drawings.

DETAILED DESCRIPTION

Embodiments of the systems described herein include an engine electronic control unit (ECU) for a vehicle, such as an automobile. The engine ECU controls, for example, starting and stopping the engine of the vehicle, such as a combustion engine. The engine ECU carries out various protocols to ensure proper operation of the engine under a wide variety of conditions. Under certain conditions, the battery for the vehicle has insufficient charge to power the engine ECU once the engine ECU has commanded the starter motor to turn. When the starter motor is engaged under these conditions, the battery voltage falls below a level sufficient to power the engine ECU, so the engine ECU resets while ignition continues and, generally, results in complete combustion and normal operation. Under these conditions, the engine ECU ideally powers-up soon after ignition and resumes normal operation. However, under certain conditions, combustion may at least partially fail and the engine is stopped. Moreover, under certain conditions, the battery's state of charge (SOC) may be insufficient to power-up the engine ECU once the current draw by the starter motor subsides and the battery voltage rises. Under a combination of these conditions, the engine ECU may fail to power-up in time to recognize a command to stop the engine. Generally, in response to such a command, the engine ECU would "clear" an indicator in memory of the ignition status, or over-write the ignition status to an off-status. Embodiments of the engine ECU described herein disable over-writing the indicator of ignition status when the SOC of the battery is determined to be insufficient to power-up the engine ECU following a reset condition. Accordingly, embodiments of the engine ECU described herein avoid the need to over-write the indicator of ignition status in response to a command to stop the engine under the combination of conditions where the engine ECU may reset and be unable to power-up in time to receive such a command.

Figure 1:
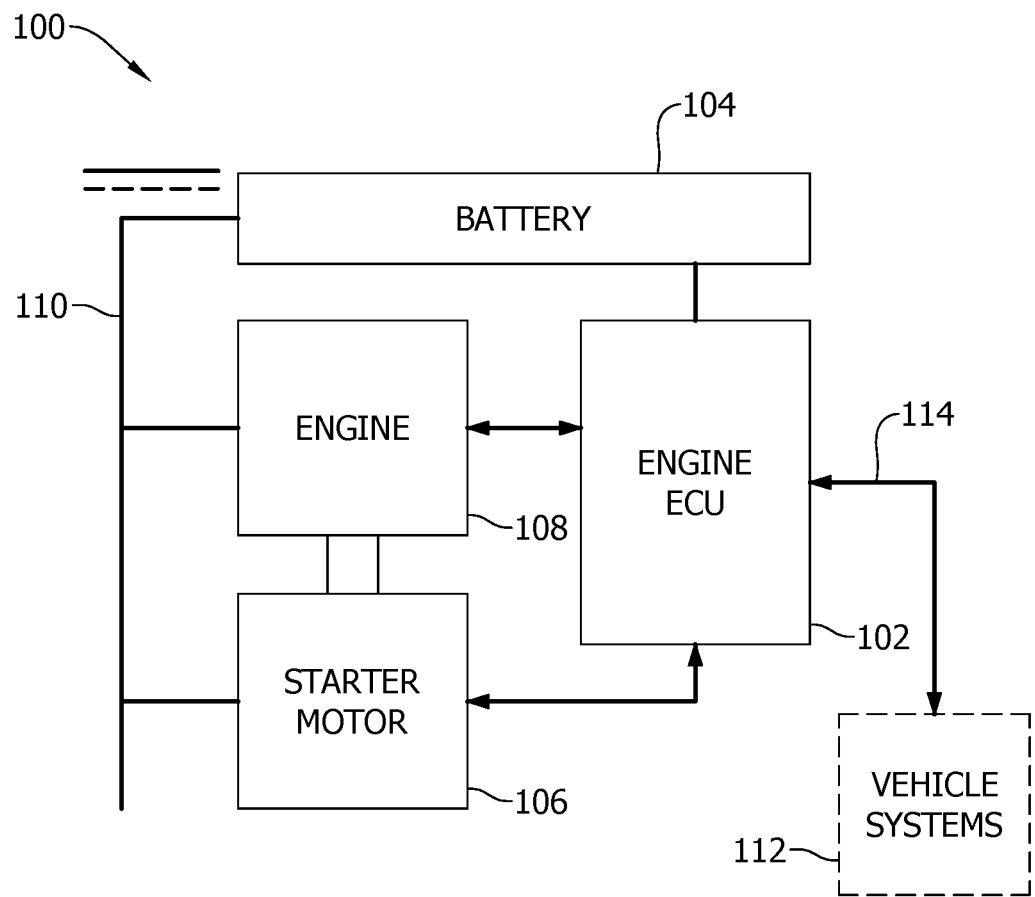
FIG. 1 is a block diagram of an exemplary engine control system.

FIG. 1 is a block diagram of an exemplary engine control system 100 for a vehicle. Engine control system 100 includes an engine ECU 102 coupled to a battery 104, a starter motor 106, and an engine 108. Battery 104 is a conventional car battery providing, for example, 12 Volts direct current (VDC). In alternative embodiments, battery 104 may be substituted for a fuel cell or other energy storage device suitable for operating the vehicle.

Generally, battery 104 supplies a DC voltage to various components of the vehicle over a DC bus 110, which typically includes one or more positive conductors and one or more negative conductors. Battery 104 supplies the DC voltage to various components of the vehicle, including, for example, engine ECU 102, starter motor 106, and one or more components of engine 108. Battery 104 may also supply the DC voltage to one or more other vehicle systems 112. The other vehicle systems may exchange various discrete inputs and outputs 114 with engine ECU 102, or carry out various other communications with engine ECU 102. For example, the other vehicle systems 112 may include, but are not limited to, lights, infotainment components, a fuel injection system, a brake controller, or an ignition switch.

One function of engine control system 100 is to start and stop engine 108. To start the engine, engine ECU 102 first receives a starter drive control command, for example, in response to a user input such as depressing an ignition switch. If engine ECU 102 determines various logical conditions are satisfied, e.g., the brakes are engaged, engine ECU 102 commands starter motor 106 to turn engine 108 to initiate combustion, i.e., ignition. Engine ECU 102 may command starter motor 106, for example, by a discrete command, or output, signal sent to starter motor 106 or an analog signal to close a relay that regulates power to starter motor 106. Furthermore, ECU 102 may also facilitate connecting a fuel injection system to the battery 104 and/or other ignition system components, for example, spark plugs. Typically, starter motor 106 turns engine 108 until full combustion is achieved and then disengages. If ignition fails, starter motor 106 may turn for a brief duration and then disengage when, for example, engine ECU 102 determines ignition has failed or in response to a subsequent user input to stop ignition. Accordingly, starter motor 106 draws a brief surge of current from battery 104, resulting in a brief drop in battery voltage.

Figure 2:
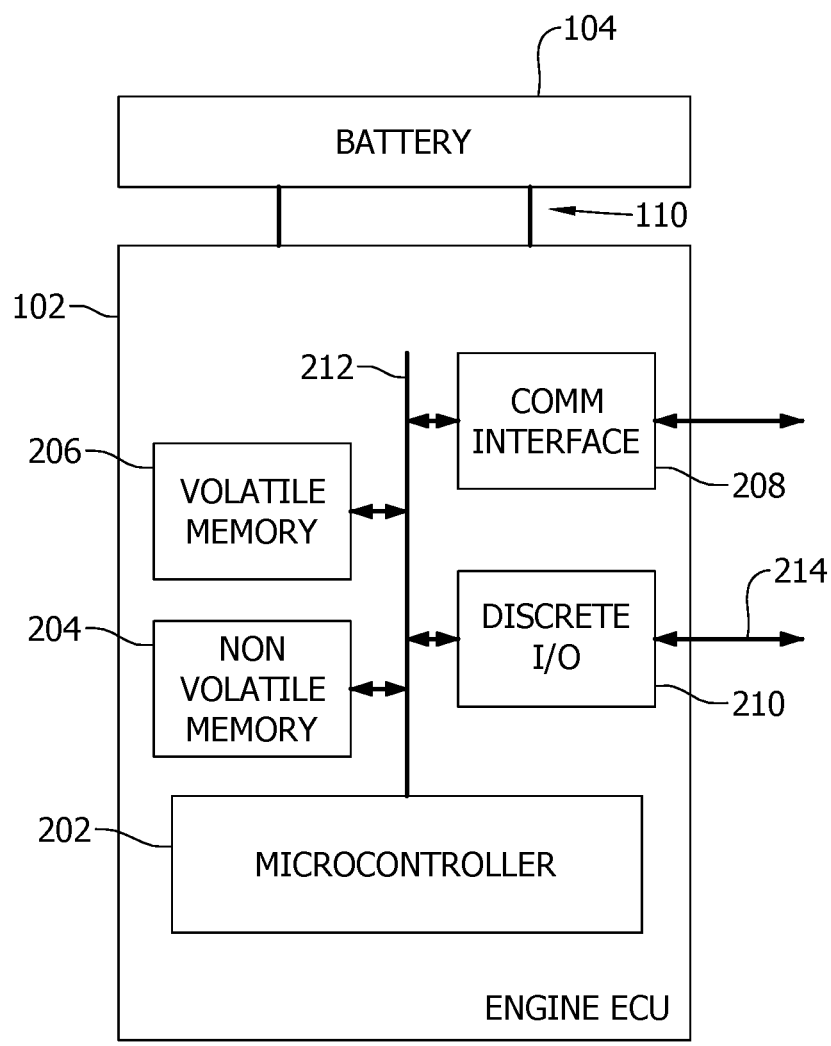
FIG. 2 is a block diagram of an exemplary engine ECU.

FIG. 2 is a block diagram of engine ECU 102. Engine ECU 102 includes a microcontroller 202 communicatively coupled to a non-volatile memory 204, a volatile memory 206, a communication interface 208, and discrete input and output (I/O) channels 210 via a data bus 212. Data bus 212 may include any suitable data communication channel, such as $I^2C$, SPI, universal asynchronous receiver-transmitter (UART), universal synchronous and asynchronous receiver-transmitter (USART), a parallel bus, a serial bus, or other electrical channel, or a suitable optical channel for enabling communication among the components of engine ECU 102 and, in certain embodiments, peripheral components external to engine ECU 102. Likewise, communication interface 208 is configured to enable communication among engine ECU 102 and one or more external devices, including, for example, other ECUs, using one or more suitable communication media, formats, and protocols, such as, for example, Ethernet, USB, IEEE 1394, RS232, CAN, or MOST. In certain embodiments, communication interface 208 may further enable wireless communication channels such as WiFi, Bluetooth, Zigbee, or one or more other suitable wireless protocols.

Volatile memory 206 includes one or more allocations of, for example, RAM. In alternative embodiments, additional volatile memory may be incorporated into microcontroller 202 itself. Further, in alternative embodiments, volatile memory 206 may be omitted. Non-volatile memory includes one or more allocations of mass storage space, non-volatile RAM (NVRAM), or other suitable non-volatile storage. Non-volatile memory 204 is configured to store a backup indicator of ignition status, sometimes referred to as a "backup RAM value." For example, the ignition status may be an off-status or an on-status, and represents the value of the starter drive control command. An initial value for the ignition status stored in non-volatile memory 204, in certain embodiments, is an off-status. Microcontroller 202 is generally configured to over-write the backup indicator from time-to-time, for example, when a starter drive control command is received over communication interface 208 or one of discrete I/O channels 210. In the event engine ECU 102 is reset during ignition, when engine ECU 102 powers-up, microcontroller 202 gains access to the indicator in non-volatile memory 204 to determine the condition of the starter drive control command.

Discrete I/O channels 210 are configured to transmit and receive various discrete I/O signals 214, including, for example, the starter drive control command and a battery SOC. The battery SOC represents an assessment of the power capacity of battery 104 as determined, for example, by another ECU or controller coupled to battery 104. The battery SOC may be expressed, for example, as a percentage of full charge, e.g., 40% or 80%. Microcontroller 202 is configured to gain access to the battery SOC via data bus 212. Microcontroller 202 is further configured to determine if the battery SOC is sufficient or insufficient to power-up engine ECU 102 following a reset condition. In one embodiment, for example, a predefined threshold between a sufficient and an insufficient battery SOC is approximately 20%, that is, a battery SOC equal to or greater than approximately 20% is sufficient to power-up engine ECU 102 following a reset condition and a battery SOC of less than approximately 20% is insufficient to power-up engine ECU 102 following a reset condition.

If microcontroller 202 determines the battery SOC is sufficient, then upon receiving an ignition command (e.g., a starter drive control command) microcontroller 202 over-writes the initial, or current, off-status of the backup indicator of ignition status with an on-status. And conversely, if microcontroller 202 determines the SOC is insufficient to power-up engine ECU 102 following a reset condition, microcontroller 202 disables over-writing the backup indicator of ignition status. Accordingly, by disabling over-writing of the backup ignition status indicator, when engine ECU 102 does eventually power-up, the backup indicator will have an off-status.

In certain embodiments, one of discrete I/O channels 210 includes a discrete input channel over which an indicator of complete combustion is received at the microcontroller 202. Microcontroller 202 is configured to over-write the backup ignition status indicator on-status with an off-status in response to the indicator of complete combustion, and disengage starter motor 106.

Figure 3:
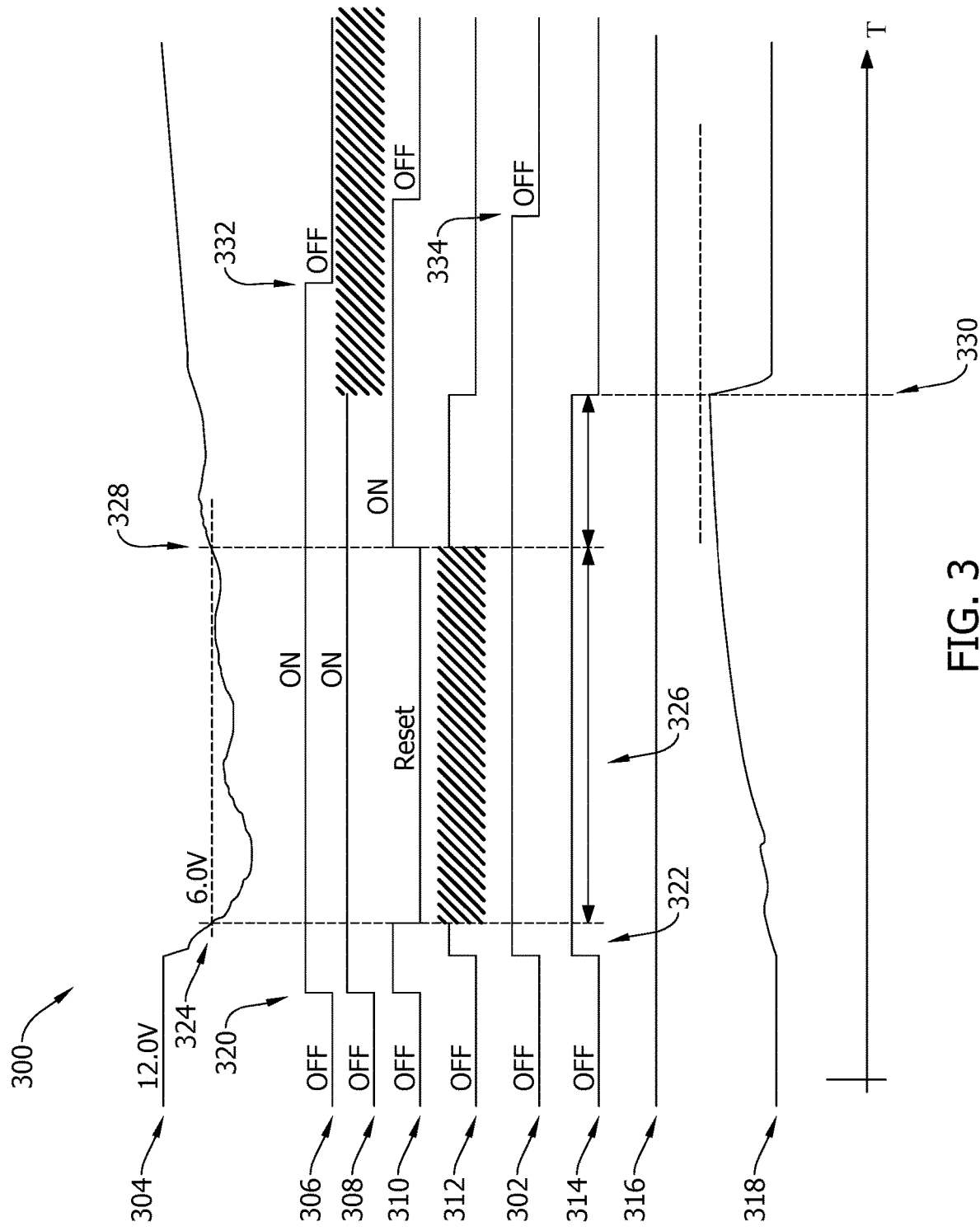
FIG. 3 is an example timing diagram illustrating operation of the engine control system shown in FIG. 1.

FIG. 3 is an example timing diagram 300 illustrating conventional operation of various aspects of engine control system 100, including the backup indicator 302 of ignition status. Timing diagram 300 includes a battery voltage plot 304, an ignition status 306, a brake status 308, an engine ECU status 310, a starter drive control command signal 312, a starter condition 314, an indicator of complete combustion 316, and an engine speed plot 318 all shown versus time (T).

Battery voltage plot 304 shows battery voltage is normal (e.g., 12 volt) when ignition is initiated 320, as shown on ignition status 306. Upon initiation 320 in combination with actuation of the brake, as indicated by brake status 308, engine ECU 102 powers up and sometime later generates starter drive control command signal 312. Engine ECU 102 determines the SOC is sufficient to restart engine ECU 102 after a reset. Accordingly, in response to starter drive control command signal 312, backup indicator 302 is written and the starter motor 106 is engaged 322, as shown by starter condition 314.

When starter motor 106 is engaged, battery voltage plot 304 droops and eventually falls below a threshold 324 (e.g., 6.0 volt), engine ECU 102 resets and does not return to normal operation until battery voltage rises above threshold 324. Engine control is maintained by hardware during a period 326, and signals otherwise generated by engine ECU 102 are invalid. When engine ECU 102 powers up 328, engine ECU 102 reads backup indicator 302 and generates starter drive control command signal 312 accordingly.

In the example illustrated in timing diagram 300, a determination is made after engine ECU 102 powers up 328 that complete combustion fails to occur, as shown by engine speed plot 318 and indicator of complete combustion 316 staying flat. Consequently, engine ECU 102 disengages 330 starter motor 106 via starter drive control command signal 312. Ignition status 306 later reverts 332 to "off" as a result of, for example, a user input, such as a user actuating an ignition switch. Backup indicator 302 is overwritten 334 to "off" in response to the change in ignition status 306.

Figure 4:
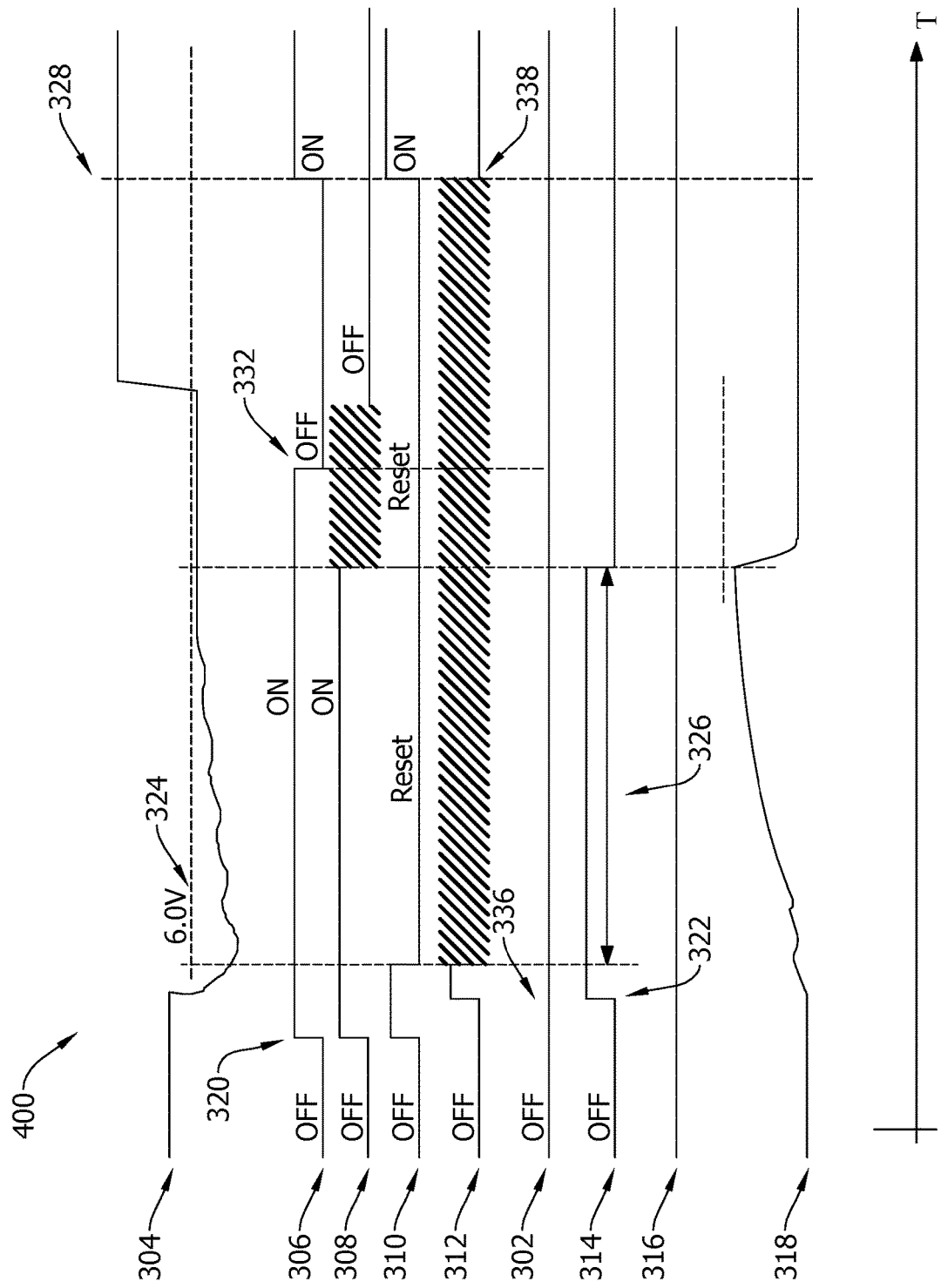
FIG. 4 is another example timing diagram illustrating operation of the engine control system shown in FIG. 1.

FIG. 4 is an example timing diagram 400 illustrating operation of various aspects of engine control system 100 with a deteriorated battery condition, as shown by battery voltage plot 304. Timing diagram 400, like timing diagram 300, includes backup indicator 302 of ignition status, battery voltage plot 304, ignition status 306, brake status 308, engine ECU status 310, starter drive control command signal 312, starter condition 314, indicator of complete combustion 316, and engine speed plot 318 all shown versus time (T).

Ignition is initiated 320 as it is in timing diagram 300, and engine ECU 102 powers up and generates starter drive control command signal 312, which engages 322 starter motor 106. However, in response to the deteriorated battery condition, engine ECU 102 determines the SOC is insufficient to restart engine ECU 102 following a reset and disables 336 writing of backup indicator 302.

As in timing diagram 300, when starter motor 106 is engaged, battery voltage plot 304 droops and eventually falls below a threshold 324 (e.g., 6.0 volt), engine ECU 102 resets and does not return to normal operation until battery voltage rises above threshold 324. Engine control is maintained by hardware during a period 326, and signals otherwise generated by engine ECU 102 are invalid. However, battery voltage plot 304 does not rise above threshold 324 and engine ECU 102 does not power up 328 until well after ignition status 306 reverts 332 to "off," for example, in response to a user input after complete combustion fails to occur and the starter motor 106 disengages 330.

Because engine ECU 102 failed to power up by the time ignition status 306 reverts 332 to "off," engine ECU 102 does not detect the change in ignition status 306 and cannot overwrite backup indicator 102. However, embodiments of engine ECU 102 described herein disabled 336 writing the original backup indicator 302. Accordingly, when engine ECU 102 powers up, the value of backup indicator 302 is, appropriately, "off," and engine ECU 102 does not attempt to resume starting the engine.

Figure 5:
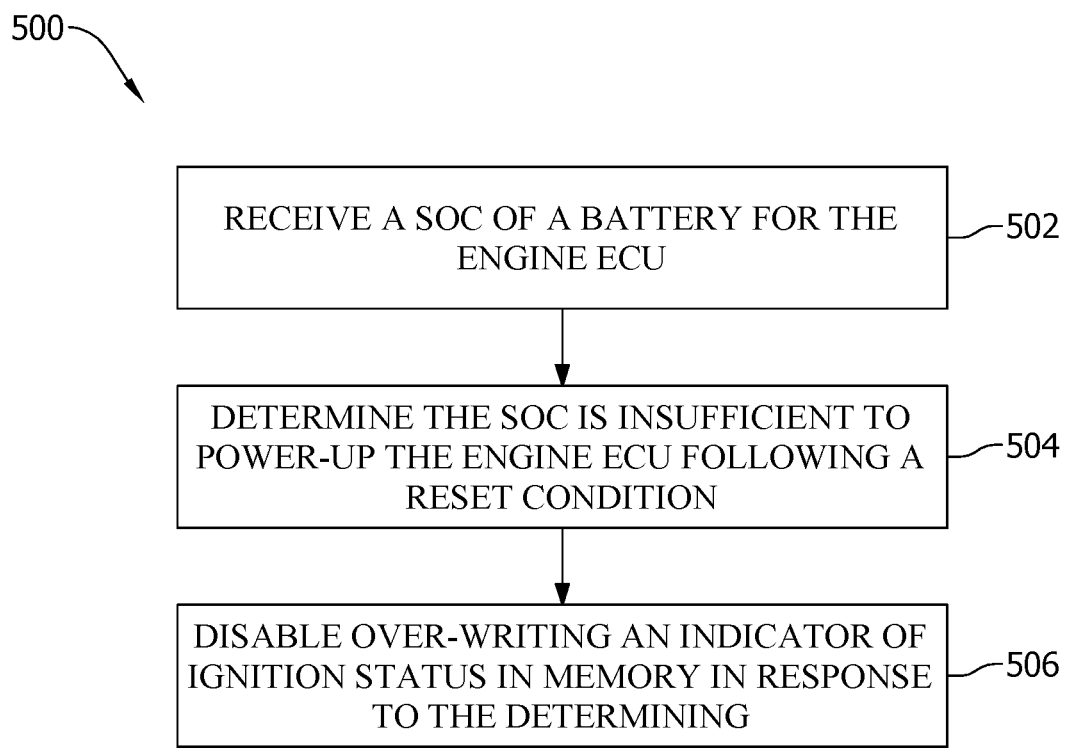
FIG. 5 is a flow diagram of an exemplary method of controlling an engine.

FIG. 5 is a flow diagram of an exemplary method 500 of operating an engine for a vehicle, such as engine 108 of the engine control system 100 shown in FIG. 1. Referring to FIGS. 1 and 5, method 500 is generally embodied in engine ECU 102. Engine ECU 102 receives 502 a SOC of battery 104, which is supplying power (i.e., battery voltage and current) to at least engine ECU 102 and starter motor 106.

Engine ECU 102 stores a backup indicator of ignition status in memory, such as non-volatile RAM. In the event engine ECU 102 loses power or otherwise resets, the backup indicator of ignition status is retrieved at a subsequent engine ECU power-up so that engine ECU 102 knows the current starter condition and can continue the engine ignition process based on that condition.

Engine ECU 102 determines 304 whether the SOC is sufficient or insufficient to power-up engine ECU 102 following a reset condition. When engine ECU 102 determines the SOC is insufficient to power-up engine ECU 102 following a reset condition, engine ECU 102 disables 306 over-writing the backup indicator of ignition status in memory. For example, in certain embodiments, the default value of the backup indicator is an off-status. Accordingly, if engine ECU 102 determines the SOC is insufficient to power-up engine ECU 102 following a reset condition, then on subsequent power-up, the backup indicator will still have the off-status value, because over-writing was disabled.

Engine ECU 102 receives an ignition command from another vehicle system 112 or other device, such as a user interface. Engine ECU 102 engages starter motor 106 in response to the ignition command. Generally, under normal operating conditions, the SOC of battery 104 is high enough (e.g., above 20%) that the indicator of ignition status may be over-written as ignition commands are received. Accordingly, if battery voltage falls below a threshold and engine ECU 102 powers-down in response, but the SOC is sufficient to power-up engine ECU 102 following the reset, the indicator is over-written upon receiving the ignition command and before starter motor 106 is engaged, resulting in a large current draw on battery 104 to turn starter motor 106 and ultimately engine 108.

In certain embodiments, engine control system 100 is configured to determine combustion by engine 108 is incomplete. In response to the failure to achieve complete combustion, a user may turn off engine 108, thereby initiating overwrite of the backup indicator to "off" Alternatively, engine ECU 102 or starter motor 106 itself may end the ignition process after a duration.

Example technical effects of the methods, systems, and apparatus described herein include at least one of: (a) maintaining control of ignition while the engine ECU is resetting; (b) evaluating SOC of the battery to determine whether the SOC is sufficient to power-up the engine ECU within a sufficient amount of time following a reset condition; (c) enabling and disabling over-writing of the indicator of ignition status; and (d) avoiding failures to update the indicator of ignition status in memory when the engine ECU itself is powered down by disabling initial over-writing of the indicator based on an assessment of the battery, e.g., SOC.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc—read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the embodiments described herein, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present disclosure or "an example embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine electronic control unit (ECU) for a vehicle, the engine ECU comprising:
   a non-volatile memory configured to store an indicator of ignition status having an initial off-status; and
   a microcontroller coupled to the non-volatile memory and configured to:
      receive a state of charge (SOC) of a battery for the engine ECU;
      determine the SOC is insufficient to power-up the engine ECU following a reset condition; and
      disable over-writing the indicator of ignition status.

2. The engine ECU of claim 1, wherein the microcontroller is further configured to:
   determine the SOC is sufficient to power-up the engine ECU following a reset condition;
   receive an ignition command; and
   over-write the initial off-status with an on-status.

3. The engine ECU of claim 2, wherein the microcontroller is further configured to transmit a discrete output signal to engage a starter motor to begin ignition of the engine.

4. The engine ECU of claim 3 further comprising a discrete input channel over which an indicator of incomplete combustion is received at the microcontroller, wherein the microcontroller is configured to over-write the on-status with an off-status in response to the indicator, and disengage the starter motor.

5. The engine ECU of claim 4, wherein the microcontroller is configured to determine the SOC is insufficient when the SOC is at most 20% of charge.

6. The engine ECU of claim 1 further comprising a discrete input channel over which the battery SOC is received at the microcontroller.

7. A method of operating an engine for a vehicle, said method comprising:
   receiving, at an engine electronic control unit (ECU), a state of charge (SOC) of a battery for the engine ECU;
   determining the SOC is insufficient to power-up the engine ECU following a reset condition; and
   disabling over-writing an indicator of ignition status in memory in response to said determining.

8. The method of claim 7 further comprising receiving an ignition command before receiving the SOC.

9. The method of claim 8 further comprising engaging a starter motor to turn the engine in response to the ignition command.

10. The method of claim 9 further comprising:
    determining combustion by the engine is incomplete; and
    disengaging the starter motor.

11. The method of claim 9, wherein engaging the starter motor results in the engine ECU entering a reset condition until a battery voltage rises above a threshold sufficient to power-up the engine ECU.

12. The method of claim 7 further comprising:
    receiving an updated SOC for the battery;
    determining the updated SOC is sufficient to power-up the engine ECU following a reset condition; and
    enabling over-writing the indicator of ignition status.

13. The method of claim 12 further comprising:
receiving an ignition command;
over-writing the indicator of ignition status to an on-status; and
engaging a starter motor to turn the engine and resulting in the engine ECU entering a reset condition.

14. The method of claim 13 further comprising:
powering-up the engine ECU; and
retrieving the indicator of ignition status from the memory.

15. An engine control system for a vehicle, the engine control system comprising:
a battery configured to supply a battery voltage;
a starter motor mechanically coupled to an engine and configured to receive the battery voltage from the battery; and
an engine electronic control unit (ECU) coupled to the starter motor and configured to:
receive the battery voltage from the battery;
receive a state of charge (SOC) for the battery;
store an indicator of ignition status for the vehicle in memory; and
disable over-writing the indicator upon determining the SOC is insufficient to power-up the engine ECU following a reset condition.

16. The engine control system of claim 15, wherein the engine ECU is further configured to receive an ignition command and engage the starter motor in response to the ignition command.

17. The engine control system of claim 16, wherein the starter motor is further configured to disengage after a duration if complete combustion is not achieved by the engine.

18. The engine control system of claim 17, wherein the engine ECU is further configured to power-down in response to a drop in the battery voltage after engaging the starter motor to turn the engine, and power-up when the battery voltage rises above a threshold.

19. The engine control system of claim 15, wherein a default value of the indicator of ignition status is an off-status.

20. The engine control system of claim 15, wherein the engine ECU is further configured to:
receive an updated SOC;
enable over-writing the indicator upon determining the updated SOC is sufficient to power-up the engine ECU following a reset condition;
receive an ignition command; and
over-write the indicator of ignition status to an on-status.

* * * * *